United States Patent
Johnson et al.

(10) Patent No.: US 10,346,140 B2
(45) Date of Patent: Jul. 9, 2019

(54) SYSTEM AND METHOD FOR MODEL BASED TECHNOLOGY AND PROCESS FOR SAFETY-CRITICAL SOFTWARE DEVELOPMENT

(71) Applicant: General Electric Company, Schenectady, NY (US)

(72) Inventors: Timothy Lee Johnson, Niskayuna, NY (US); Andrew Walter Crapo, Dousman, WI (US); Michael Richard Durling, Niskayuna, NY (US); Alexander Walsch, Bayern (DE); Kit Yan Siu, Niskayuna, NY (US); Luca Parolini, Bayern (DE); Panagiotis Manolios, Sharon, MA (US); Meng Li, Niskayuna, NY (US); Han Yu, Niskayuna, NY (US); Scott Alan Stacey, Dayton, OH (US); Gregory Reed Sykes, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 499 days.

(21) Appl. No.: 14/819,167

(22) Filed: Aug. 5, 2015

(65) Prior Publication Data
US 2017/0039039 A1    Feb. 9, 2017

(51) Int. Cl.
G06F 8/20      (2018.01)
G06F 8/35      (2018.01)
G06F 11/36     (2006.01)

(52) U.S. Cl.
CPC ............ *G06F 8/35* (2013.01); *G06F 8/20* (2013.01); *G06F 11/3604* (2013.01)

(58) Field of Classification Search
CPC .......... G06F 8/35; G06F 8/20; G06F 11/3604
(Continued)

(56) References Cited

U.S. PATENT DOCUMENTS 6,681,383 B1    1/2004    Pastor et al.
7,228,524 B2    6/2007    Bailey et al.
(Continued)

FOREIGN PATENT DOCUMENTS

EP    1622022 A1    2/2006
EP    1832975 A1    9/2007
(Continued)

OTHER PUBLICATIONS

GB Search Report and Opinion issued in connection with corresponding GB Application No. 1613356.3 dated Jan. 24, 2017.
(Continued)

*Primary Examiner* — Lewis A Bullock, Jr.
*Assistant Examiner* — Theodore E Hebert
(74) *Attorney, Agent, or Firm* — Buckley, Maschoff & Talwalkar LLC

(57) ABSTRACT

A method for model-based design of safety-critical software is disclosed. The method includes receiving natural-language software requirements, developing a specification model by implementing either semantic modeling or graphical modeling, applying formal requirements analysis to the specification model, auto generating requirements based and robustness test cases from the specification model, developing a design model based on the specification model, applying test cases to the design model, auto-generating source code using the design model, verifying the source code using both test cases and static analysis technology, and compiling executable object code from the verified source code. If a result of the analysis of the software specification or design models is not satisfactory then adjusting the specification or design model to correct any inconsistency, and repeating applying the analysis and test cases. A system for implementing the model-based design and a non-transitory computer readable medium are disclosed.

22 Claims, 3 Drawing Sheets

(58) Field of Classification Search
USPC .......................................................... 717/104
See application file for complete search history.

(56) References Cited

U.S. PATENT DOCUMENTS

| | | | |
|---|---|---|---|
| 7,278,130 B2 | 10/2007 | Iborra et al. | |
| 7,392,509 B2* | 6/2008 | Sinha | G06F 11/3684 |
| | | | 714/E11.207 |
| 7,480,893 B2 | 1/2009 | Berenbach et al. | |
| 7,523,425 B2 | 4/2009 | Bunin et al. | |
| 7,555,742 B2 | 6/2009 | Iborra et al. | |
| 7,685,576 B2 | 3/2010 | Hartmann et al. | |
| 7,865,339 B2 | 1/2011 | Rushby et al. | |
| 8,176,470 B2 | 5/2012 | Klumpp et al. | |
| 8,307,342 B2* | 11/2012 | Oglesby | G06F 11/3684 |
| | | | 717/124 |
| 8,359,576 B2 | 1/2013 | Prasad et al. | |
| 8,370,798 B2* | 2/2013 | Broadfoot | G06F 8/10 |
| | | | 717/107 |
| 8,943,465 B2 | 1/2015 | Broadfoot et al. | |
| 9,747,079 B2* | 8/2017 | Siu | G06F 8/20 |
| 2002/0100014 A1* | 7/2002 | Iborra | G06F 8/30 |
| | | | 717/104 |
| 2004/0210873 A1 | 10/2004 | Tudor | |
| 2005/0240794 A1* | 10/2005 | Sinha | G06F 11/3684 |
| | | | 714/1 |
| 2007/0074180 A1* | 3/2007 | Hinchey | G06F 8/10 |
| | | | 717/136 |
| 2009/0089618 A1 | 4/2009 | Rajan et al. | |
| 2011/0083121 A1* | 4/2011 | Dixit | G06F 11/3684 |
| | | | 717/124 |
| 2011/0125302 A1 | 5/2011 | Sethuraman et al. | |
| 2012/0143570 A1 | 6/2012 | Austin et al. | |
| 2012/0246612 A1* | 9/2012 | Ji | G06F 11/3664 |
| | | | 717/104 |
| 2014/0130006 A1 | 5/2014 | Son et al. | |
| 2016/0170864 A1* | 6/2016 | Li | G06F 11/3684 |
| | | | 717/126 |
| 2017/0039039 A1* | 2/2017 | Johnson | G06F 8/35 |

FOREIGN PATENT DOCUMENTS

| | | |
|---|---|---|
| EP | 2 369 528 A1 | 9/2011 |
| JP | 2007-122135 A | 5/2007 |
| JP | 2009-087354 A | 4/2009 |
| JP | 2009-294846 A | 12/2009 |
| JP | 2015-005189 A | 1/2015 |
| WO | 2014087427 A1 | 6/2014 |
| WO | 2014115189 A1 | 7/2014 |
| WO | 2015/040735 A1 | 3/2015 |

OTHER PUBLICATIONS

Martin, Lukas et al., "A Methodology for Model-based Development and Automated Verification of Software for Aerospace Systems", IEEEAC Paper #2282, Version 3, Updated Dec. 21, 2012, ISSN: 978-1-4673-1813-6/13, (pp. 1-19, 19 total pages).

Machine Translation and Notification of Reasons for Refusal issued in connection with corresponding JP Application No. 2016-147916 dated Sep. 5, 2017.

* cited by examiner

SYSTEM AND METHOD FOR MODEL BASED TECHNOLOGY AND PROCESS FOR SAFETY-CRITICAL SOFTWARE DEVELOPMENT

BACKGROUND

The pervasiveness of microprocessor-controlled equipment has led to ever more capable devices, but it also places more reliance on the quality of the software that controls these embedded systems. Many potentially dangerous pieces of equipment are controlled by embedded software (e.g., cars, trains, airplanes, oil refineries, chemical processing plants, nuclear power plants, and medical devices, etc.). Conventional approaches to verifying the correctness of operational application code for these devices and systems are difficult and inefficient.

Safety-critical software systems development addresses the increase in size and complexity of these systems, and respects the need to maintain safety-critical operations. There are a range of software engineering methods, tools, and frameworks to develop complex, critical systems. For example, one method is applying model-driven engineering techniques to safety-critical systems development.

Conventional approaches can include the use of commercially-available integrated design environment (IDE) tools to perform software specification modeling, validation/verification, and test case generation and execution. Typically these tools use rigorous methods to automate or semi-automate a portion of the detailed design steps, while reducing data entry requirements to save time with the remaining steps.

DESCRIPTION

In accordance with embodiments, systems and methods provide a model-based automated design process for the development and test generation of safety critical software. Embodying systems and methods employ a domain-specific ontology and formal verification methods to improve and extend top-level requirements. These systems and methods utilize a verifiable specification model (hence the name, "model-based") as the basis of automatically generating requirements-based tests before software is written. In accordance with embodiments, requirements-based tests are generated from the specification model. A design model is used to develop software. The rigor and automation of these steps result in improved software design and reduced test effort, saving time and cost for a safety-critical software developer.

By incorporating formal methods and logical models in the embodying processes, errors in specification requirements can be identified and the requirements can be verified for consistency and completeness. Upon identification of errors, requirements can be repaired, iteratively if necessary, until they are logically-complete and consistent when re-tested. Ontologies, semantic nets, and coverage analysis all provide explicit information for extending requirements that are incomplete.

Embodying systems and methods can incorporate "safety cases" into the requirements and corresponding verification steps (e.g., model based design). Complex temporal relationships (e.g., concurrency requirements and/or capabilities) can also be represented.

Once the software specification requirements are complete and consistent, design models and subsequent verification/validation tests can be generated for the testing of source code. The source code can be viewed as a more detailed representation of the specified design, resulting in object and/or executable code that embodies the same design requirements.

Embodying approaches result in a reduction of errors detected during verification/validation activities. Embodying systems and methods automate these processes resulting in a more rigorous design/verification/validation process providing a reduction in development associated labor and time costs by providing a higher accuracy in meeting design requirements and greater speed in correcting and testing in comparison to conventional, manual tool-aided code generation.

Embodying model-based systems and methods substitute mathematically-rigorous, formal logical statements defining operational, design, and test generation requirements for natural-language based statements, thus providing an opportunity, during the early design process, to improve the quality, rigor, consistency, and scope of requirements.

Figure 1:
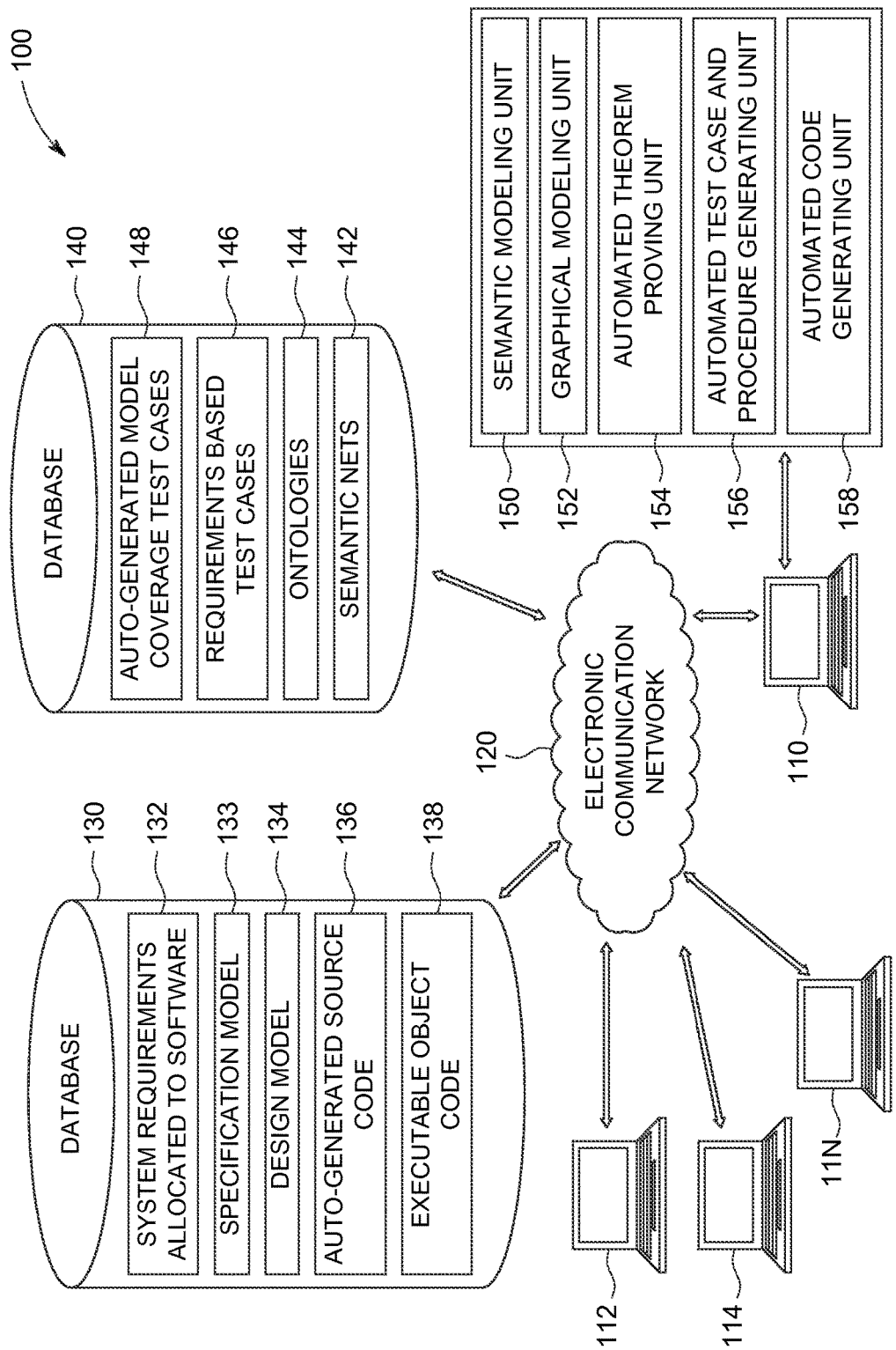
FIG. 1 depicts a system for model-based design of safety-critical software in accordance with embodiments.

FIG. 1 depicts system 100 for safety-critical computer software development in accordance with an embodiment. System 100 can include a computer (either single computer 110 operating locally, or several computers 112, 114, 11N linked together by electronic communication network 120 (e.g., the Internet), associated database 130 that can include specifics of the safety-critical software—e.g., system requirements allocated to software (SRATS) 132, software specification model 133, design model 134, auto-generated source code 136, executable object code 138. System 100 can also include database 140 that can include semantic nets 142, ontologies 144, requirement based test cases 146, and auto-generated model coverage test cases 148. Although database 130 and database 140 are depicted as two databases, in some implementations one database can include all the storage; in other implementations more than two databases can be included in system 100.

In accordance with an implementation, single computer 110 can include structure units configured to perform actions that implement the mode-based safety-critical software design. These units can include semantic modeling unit 150, graphical modeling unit 152, automated theorem proving (ATP) unit 154, automated test case and procedure generating (ATCPG) unit 156, and automated code generating unit 158. In other implementations, these units can be distributed among the several computers linked together by the electronic communication network.

Figure 2:
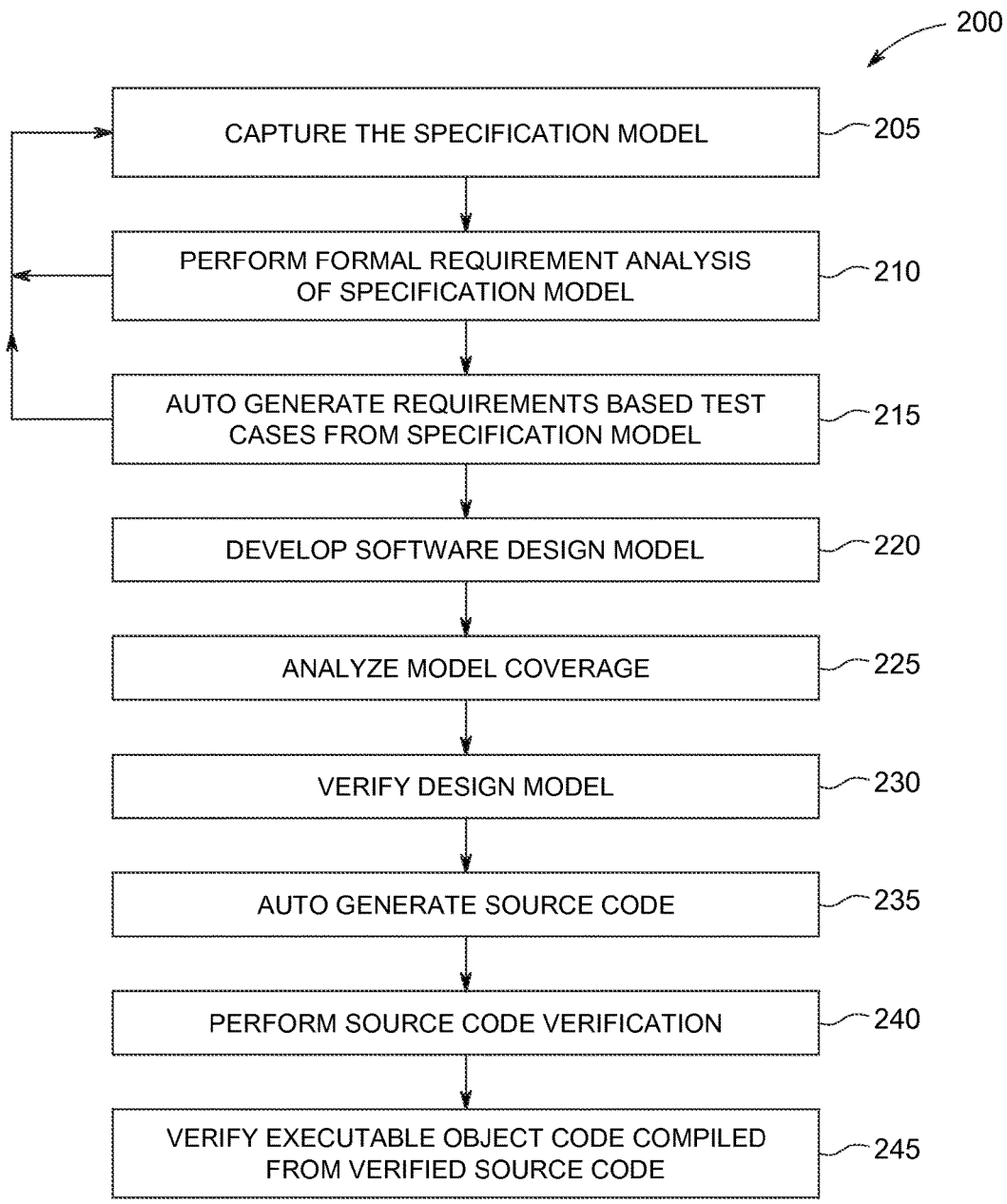
FIG. 2 depicts a flowchart of a process for model-based design of safety-critical software in accordance with embodiments.

FIG. 2 depicts a flowchart of process 200 for model-based design of safety-critical software in accordance with embodiments. Process 200 analyzes natural-language SRATS, develops a specification model which, after verification and acceptance, is the basis for a design model. The term "design model" (as used herein) is a conceptual model, such as an object model or Unified Modeling Language (UML) model. A design model can depict the entities and functional transformations to be performed by the application software.

From the design model, first source code can be auto-generated by process 200 and then executable object code (EOC) can be generated as well. Process 200 can verify the design, source code and EOC. The EOC resulting from this requirements-based process can be subsequently subjected to EOC-based testing methods, which can provide additional feedback.

The specification model is captured, step 205. Capture can include validation of the textual, natural-language system requirement SRATS provided to the system. Semantic modeling unit 150 and/or graphical modeling unit 152 implement semantic and graphical modeling techniques to develop a specification model from the SRATS. The specification model is implemented in a structured natural language that includes a semantic model and can be viewed or edited in a graphical form.

Formal requirement analysis on the specification model is performed, step 210. The specification model can be analyzed and verified for correctness and consistency by ATP unit 154 implementing automated theorem proving techniques. Test cases from the specification model are auto-generated, step 215, by ATCPG unit 156. In accordance with embodiments, the system can employ the ATCPG to auto-generate test cases for the requirements of the design model itself. In other implementations, the auto-generated test cases can be automatically generated by system 100 using model checking or other formal analysis technology. Process 200 can go back to step 205 to further capture the specification model should the requirement analysis and/or the generated test cases indicate that the model is not as robust as is needed (i.e., that the software specification model lacks the required consistency, correctness, and/or completeness).

After the requirement analysis indicates that the requirements are complete and self-consistent, the specification model is the basis for development of a software design model, step 220. The test cases are generated from the specification model and applied on the design model. After the test cases are applied to the design model, the model coverage is analyzed, step 225, based on its performance. Any defects or inconsistencies can be corrected, then the design model can be verified, step 230, by repeating the test case scenarios.

The verified design model is used by automated code generating unit 158 to auto-generate, step 235, source code for the safety-critical software. System 100 then verifies, step 240, the source code using static analysis technology. Executable object code is compiled, step 245, from the verified source code.

Figure 3:
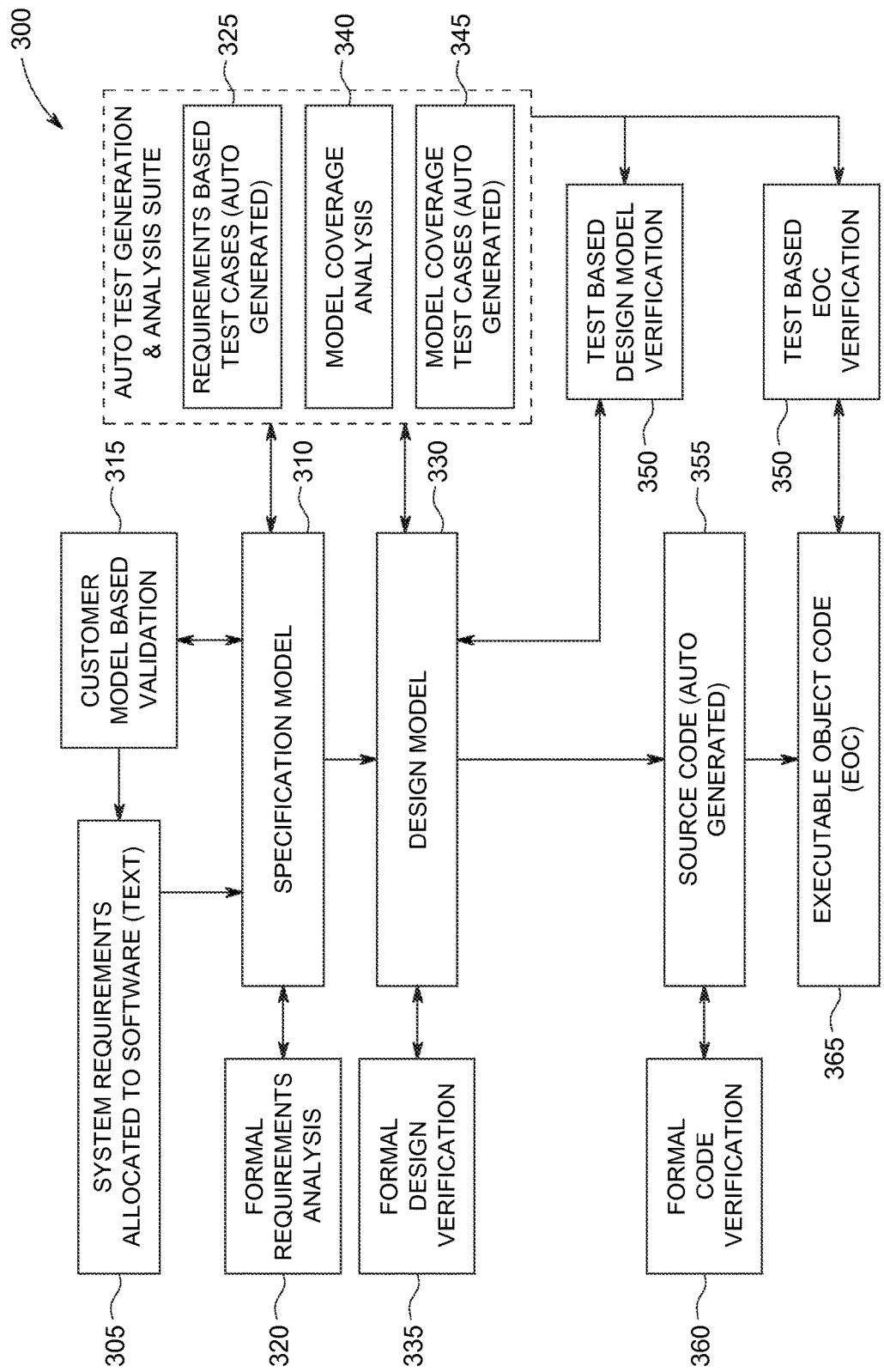
FIG. 3 depicts a flowchart for a model-based development process in accordance with embodiments.

FIG. 3 depicts a flowchart for model-based development process 300 in accordance with embodiments. System 100 for safety-critical computer software development can include computer-implemented applications 315, 320, 335, 340, 350, 360, 370 which receive design information from stages 305, 310, 325, 330, 35, 355, 365 of model-based development process 300. In some implementations, the received design information can be supplemented with additional commands and/or instructions from human users of system 100. Based on the received design information, as processed by the computer-implemented applications of system 100, process 300 can produce new results—for example: confirmation of completeness, design models, new software tests, and/or messages identifying defects which specify a shortcoming or incompleteness of the design data for a particular stage of the design process.

If a defect-identifying message is produced, then process 300 returns to the data of the preceding step (indicated by two-way arrow connecting various process steps within process 300). The defect can be corrected by a human user according to a recommendation provided by computer-implemented process 300.

Initial SRATS data provided to process 300, step 305, includes natural language documents. System 100 for safety-critical computer software development automatically-generates software and automatically-generates test cases, as well as other diagnostic information or documentation produced at earlier stages. This software, test cases, other diagnostic information and documentation are based on the provided SRATS. Process 300 as implemented by system 100 improves safety-critical software design with a reduction of manual interaction in the design process. To achieve the automated development, in accordance with embodiments, process 300 includes computer-implemented applications customer model based validation (step 315), formal requirements analysis (step 320), Formal design verification (step 335), model coverage analysis (step 340), test based design model verification (step 350), formal code verification (step 360), test based EOC verification (step 370).

Process 300 starts with receiving, step 305, textual natural-language documents SRATS derived from higher-level system requirements that include both hardware and software capabilities. From the SRATS a Specification Model is developed, step 310, using a combination of semantic modeling and graphical modeling technologies. In accordance with embodiments, system 100 implementing process 300 eliminated the need for capturing High Level Requirements (HLR's) as text. In accordance with embodiments, the conventional HLRs are replaced with a human and machine readable Specification Model.

The Specification Model is validated, step 315. The validation can be done with the aid of analytic representations (e.g., ontologies and semantic nets) of the requirements presented to a user. The Specification Model is formally analyzed and verified, step 320, for correctness and consistency using ATP applications. This step can identify errors in requirements early in the process, and significantly reduce late-cycle rework.

There is a feedback loop from the requirements analysis 320 to the specification model capture 310. This feedback loop provides real time feedback to alert an engineer to an error.

After validation and formal requirement analysis, the Specification Model passes as an input to create, step 330, a Design Model. The Design model is formally verified using model checking, step 335. The Specification Model is also used as an input to the Requirements Based Automated Test Case Generation Process, step 325. Test cases and procedures are automatically generated (e.g., using model checking technology). The test cases are then applied, step 350, to the Design Model and analyzed for correct functionality.

There is another feedback loop from the requirements based test case generation function 325 to the specification model 310 to indicate a verification complexity metric which is proportional to the number of test cases required to verify the specification model. The requirements capture engineer may use this information to simplify the specification model in order to lower the verification cost/complexity. In accordance with implementations, the requirements capture tool can also provide suggested options to capture the same information in a grammar that would be easier to verify (fewer test cases).

When errors are detected, the design model is corrected. Defects and inconsistencies may be detected in cases where a sequence of steps are performed, or where the order of concurrent steps cannot be predicted: in these cases, design model corrections may be made by back-stepping through the sequences, or by enforcing temporal ordering of otherwise un-ordered steps. Next the test cases are applied to the Design Model and analyzed for model coverage (step 340). This step can identify gaps in coverage based on (a) errors in the requirements based test cases, specification model, and/or design model (e.g., unintended functionality, dead code, etc.); or (b) derived requirements. In the case of derived requirements, test cases are automatically generated, step 345 to satisfy model coverage.

An automated test generation tool can be used to assist an engineer identify unreachable code, and to identify a test vector that will execute the specific section of the model. A qualified auto code generation tool is used to create, step 355 source code from the design model. The source code is formally analyzed, step 360, using static analysis technology. The source code is compiled, step 365, into EOC. Test based EOC verification is performed, step 370, by re-applying the test suite developed earlier in the process. Once verification is performed, the compiled EOC can then be subjected to traditional unit, subsystem, and system testing.

Systems and methods in accordance with embodiments apply rigorous mathematical and logical modeling techniques to the problem of verifying consistency, correctness, and/or completeness of software requirements prior to the generation of code. In accordance with implementations, a collection of tools can cover all stages of preliminary design, analysis, and software generation. Pre-verification makes practical the use of automatic code generation, and the use of feedback in the design process. Embodying processes and systems can detect errors during the conceptual and preliminary design processes. Correction of these detected errors can extend, improve, correct and/or complete the design information before code is generated.

In accordance with some embodiments, a computer program application stored in non-volatile memory or computer-readable medium (e.g., register memory, processor cache, random access memory, read-only memory, compact disc read-only memory, hard drive, flash memory, magnetic media, etc.) may include code or executable instructions that when executed may instruct and/or cause a controller or processor to perform methods discussed herein such as a method for model-based design of safety-critical software, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method for model-based design of safety-critical software, the method comprising:
receiving natural-language software requirements;
developing a software specification model in a structured natural language by implementing at least one of semantic modeling and graphical modeling of the natural-language software requirements;
applying formal requirement analysis of the software specification model;
providing requirements error feedback from formal requirement analysis to the software specification model in real time to alert an user about the requirements error;
automatically generating requirements based and robustness test cases from the software specification model;
developing a software design model based on the specification model;
conducting formal analysis of the software design model;
verifying coverage and behavior of the software design model by applying automatically generated requirements based and robustness test cases to the software design model;
auto-generating source code using the software design model;
verifying coverage and behavior of the source code by applying automatically generated test cases and static analysis technology;
compiling executable object code from the verified source code;
verifying coverage and behavior of the executable object code by applying automatically generated test cases;
wherein verifying coverage and behavior of the software design model further comprises:
automatically identifying defects which specify a shortcoming or incompleteness in the software design model or automatically generated requirements based and robustness test cases;
correcting the defects in the software design model or automatically generated requirements based and robustness test cases; and
automatically generating additional test cases to satisfy design model test coverage;
wherein correcting the defects includes providing a recommendation to the user of deficiency resolution based on a defect-identifying message.

2. The method of claim 1, including an automated test case and procedure generating unit auto-generating the test cases from the software specification model.

3. The method of claim 2, wherein the automated test case and procedure generating unit identifies a test vector that will execute a specific section of the software design model.

4. The method of claim 1, including an automated theorem proving unit implementing automated theorem proving techniques to analyze and verify at least one of a consistency, a correctness, and a completeness of the software specification model.

5. The method of claim 1, including if a result of the analysis of the software specification model is not satisfactory then adjusting the software specification model to correct any inconsistency with the natural-language software requirements.

6. The method of claim 5, including applying the requirements analysis to the adjusted software specification model.

7. The method of claim 1, including an automated requirements based and robustness test case and procedure generating unit auto-generating the test cases applied to the software design model.

8. The method of claim 1, including using model checking technology to generate the requirements based and robustness test cases applied to the software design model.

9. The method of claim 1, including if a result of the analysis of the software design model is not satisfactory then adjusting the software design model to correct any inconsistency with the software specification model.

10. The method of claim 9, including applying the test cases to the adjusted software design model.

11. The method of claim 1, wherein the defects include at least one of unintended functionality and dead code.

12. A non-transitory computer readable medium having stored thereon instructions which when executed by a processor cause the processor to perform a method for model-based design of safety-critical software, the method comprising:
   receiving natural-language software requirements;
   developing a software specification model in a structured natural language by implementing at least one of semantic modeling and graphical modeling of the natural-language software requirements;
   applying formal requirements analysis of the software specification model;
   providing requirements error feedback from formal requirement analysis to the software specification model in real time to alert an user about the requirements error;
   automatically generating requirements based and robustness test cases from the software specification model;
   developing a software design model based on the software specification model;
   conducting formal model analysis of the software design model;
   verifying coverage and behavior of the software design model by applying automatically generated requirements based and robustness test cases to the software design model;
   auto-generating source code using the software design model;
   verifying the source code by applying test cases and static analysis technology;
   compiling executable object code from the verified source code;
   applying test cases to the executable object code;
   wherein verifying coverage and behavior of the software design model further comprises:
      automatically identifying defects which specify a shortcoming or incompleteness in the software design model or automatically generated requirements based and robustness test cases;
      correcting the defects in the software design model or automatically generated requirements based and robustness test cases; and
      automatically generating additional test cases to satisfy design model test coverage;
         wherein correcting the defects includes providing a recommendation to the user of deficiency resolution based on a defect-identifying message.

13. The non-transitory computer-readable medium of claim 12, the instructions further causing the processor to instruct an automated test case and procedure generating unit to auto-generate the test cases from the software specification model.

14. The non-transitory computer-readable medium of claim 12, the instructions further causing the processor to instruct an automated theorem proving unit to implement automated theorem proving techniques to analyze and verify at least one of a consistency, a correctness, and a completeness of the software specification model.

15. The non-transitory computer-readable medium of claim 12, the instructions further, if a result of the analysis of the software specification model is not satisfactory, causing the processor to adjust the software specification model to correct any inconsistency with the structured natural-language software requirements.

16. The non-transitory computer-readable medium of claim 15, the instructions further causing the processor to apply the test cases to the adjusted software specification model.

17. The non-transitory computer-readable medium of claim 12, the instructions further causing the processor to instruct an automated test case and procedure generating unit to auto-generate the requirements based and robustness test cases applied to the software design model.

18. The non-transitory computer-readable medium of claim 12, the instructions further causing the processor to use model checking technology to generate the requirements based and robustness test cases applied to the software design model.

19. The non-transitory computer-readable medium of claim 12, the instructions further, if a result of the analysis of the software design model is not satisfactory, causing the processor to adjust the software design model to correct any inconsistency with the software specification model; and
   apply the test cases to the adjusted software design model.

20. A system for model-based design of safety-critical software, the system comprising:
   at least one computer having a processor connected to an electronic communication network;
   the processor executing instructions that cause the processor to control:
      at least one of a semantic modeling unit configured to perform semantic modeling techniques and a graphical modeling unit configured to perform graphic modeling techniques, the semantic modeling unit and the graphical modeling unit configured to separately develop a software specification model in a structured natural language from natural-language software requirements;
      a formal requirement analysis of the software specification model;
   a feedback loop to provide requirements error feedback from formal requirement analysis to the software specification model to alert an user in real time;
      an automated test case and procedure generating unit configured to auto-generate the requirements based and robustness test cases for verification of a software design model developed from the software specification model;
      an automated theorem proving unit configured to implement automated theorem proving techniques to analyze and verify at least one of the software specification model and the software design model;
      an automated code generating unit configured to auto-generate source code from the software design model;
   wherein the verification of software design model further comprises:
      identifying defects which specify a shortcoming or incompleteness in the software design model or automatically generated requirements based and robustness test cases;

correcting the defects in the software design model or automatically generated requirements based and robustness test cases; and automatically generating additional test cases to satisfy design model test coverage;

wherein correcting the defects includes providing a recommendation to the user of deficiency resolution based on a defect-identifying message.

21. The system of claim 20, further including instructions that cause the processor to:

verify the source code by applying test cases and static analysis technology; and compile executable object code from the verified source code.

22. The system of claim 21, further including instructions that cause the processor to:

if a result of the analysis of the software specification model is not satisfactory then adjust the software specification model to correct any inconsistency with the natural-language software requirements;

apply the test cases to the adjusted software specification model;

if a result of the analysis of the software design model is not satisfactory then adjusting the software design model to correct any inconsistency with the software specification model; and apply the test cases to the adjusted software design model.

\* \* \* \* \*